No. 883,087. PATENTED MAR. 24, 1908.
C. E. CLUGSTON.
HAY LOADER.
APPLICATION FILED MAY 14, 1907.
3 SHEETS—SHEET 1.
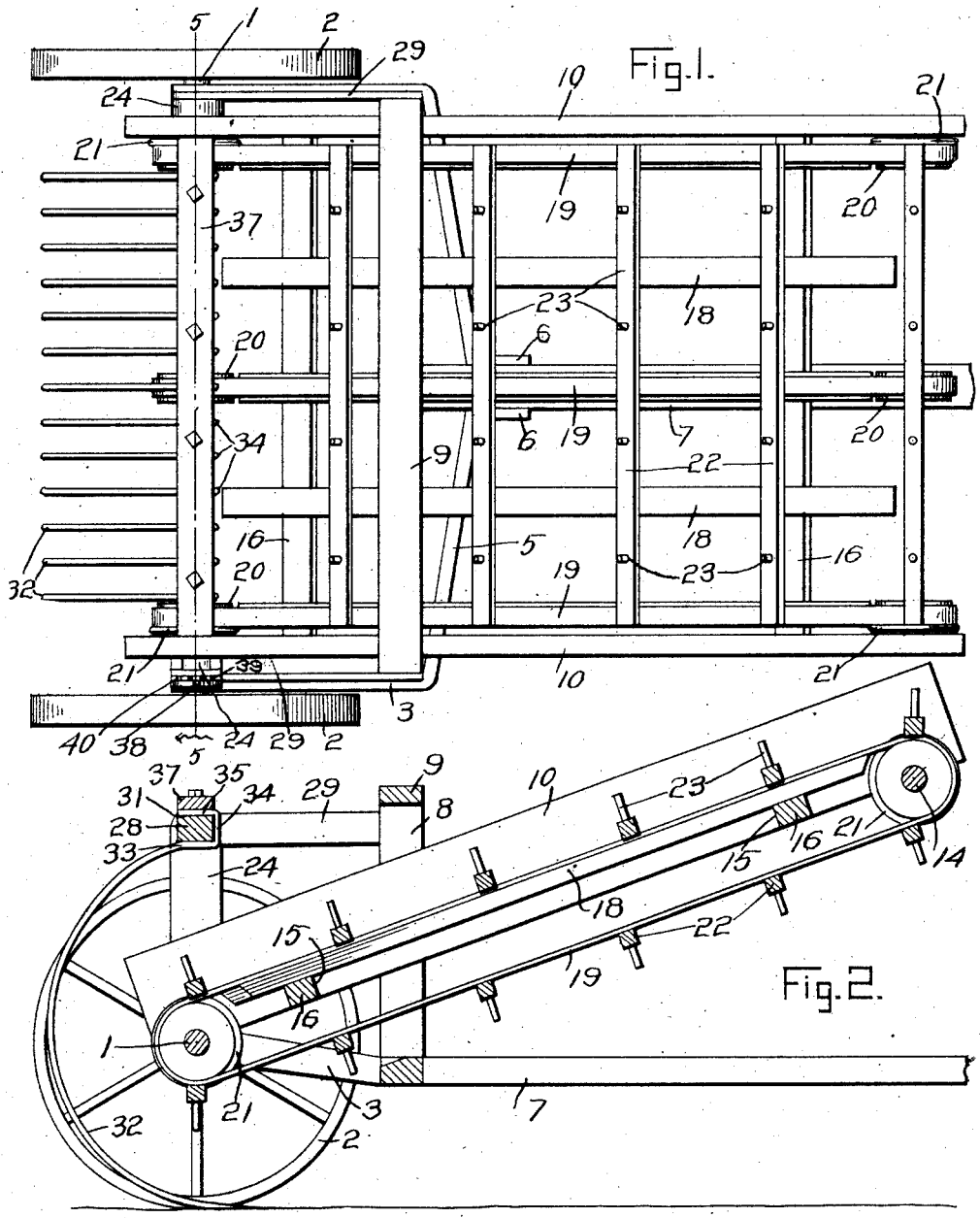

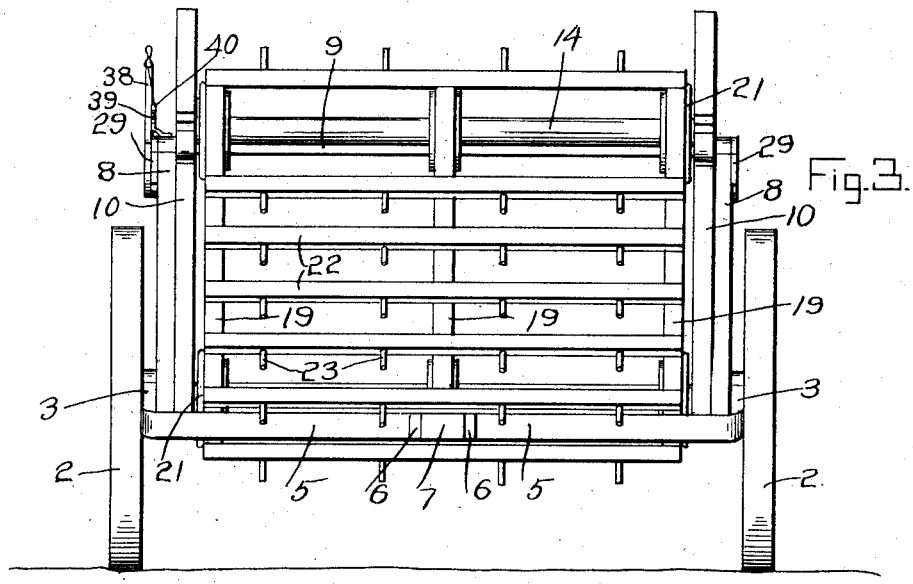
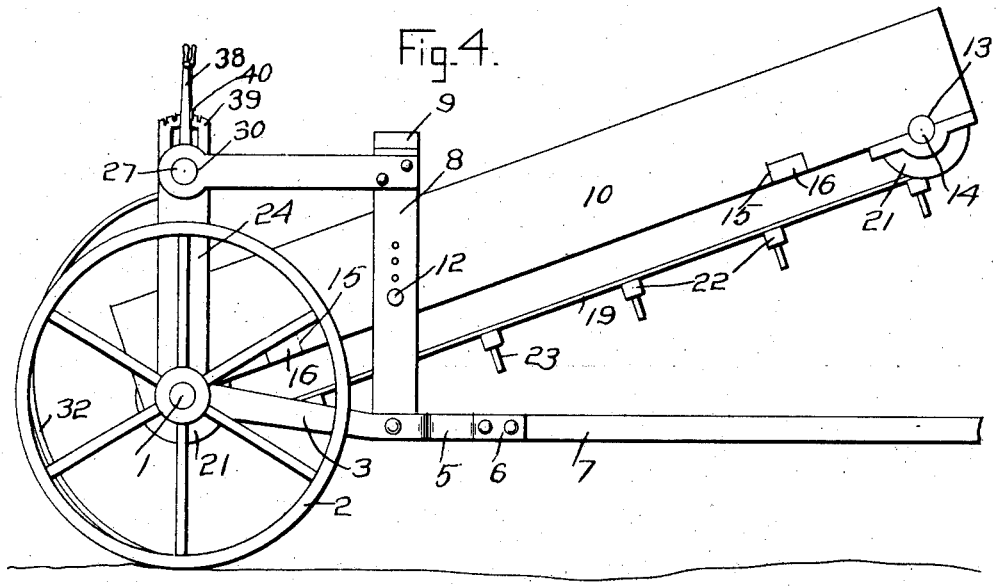

No. 883,087. PATENTED MAR. 24, 1908.
C. E. CLUGSTON.
HAY LOADER.
APPLICATION FILED MAY 14, 1907.

3 SHEETS—SHEET 3.

Witnesses
C. K. Reichenbach
John S. Powers

Inventor
Charles C. Clugston.
By Chandler & Chandler
Attorneys.

UNITED STATES PATENT OFFICE.

CHARLES E. CLUGSTON, OF BIGSPRING, NEBRASKA.

HAY-LOADER.

No. 883,087.      Specification of Letters Patent.      Patented March 24, 1908.

Application filed May 14, 1907. Serial No. 373,681.

*To all whom it may concern:*

Be it known that I, CHARLES E. CLUGSTON, a citizen of the United States, residing at Bigspring, in the county of Deuel, State of Nebraska, have invented certain new and useful Improvements in Hay-Loaders; and I do hereby declare the following to be a full, clear, and exact description of the invention, such as will enable others skilled in the art to which it appertains to make and use the same.

This invention relates to new and useful improvements in hay loaders, and it has particular reference to a machine of this character embodying an endless conveyer movable with and working in the rear of a wagon and a rake disposed rearwardly of the conveyer.

Figure 5:
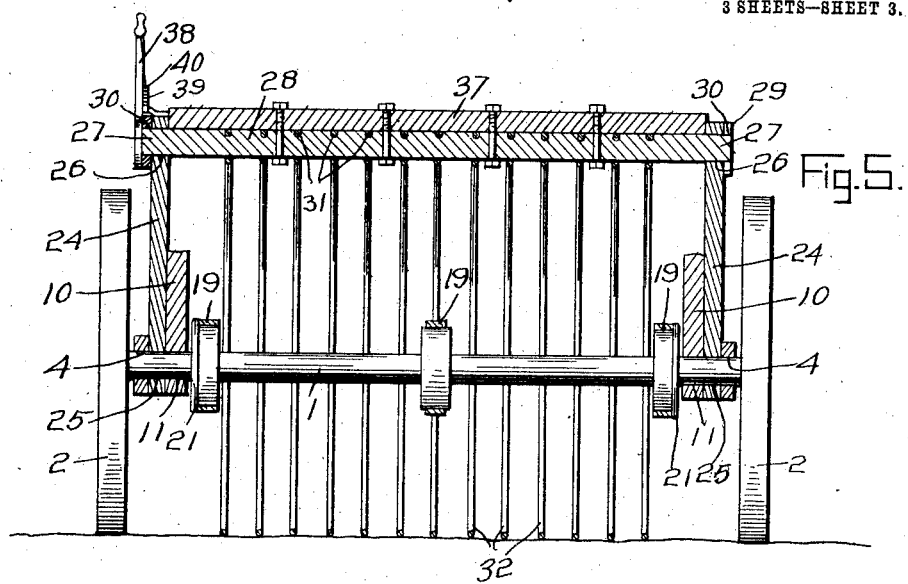
Figure 6:
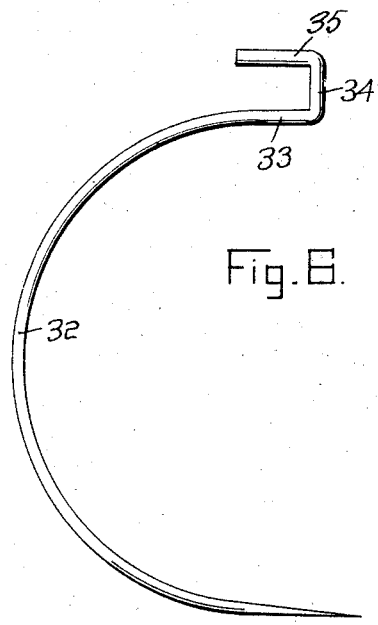

In connection with a hay loader of the above type the invention aims as a primary object to provide a novel construction, combination and arrangement of parts, the details of which will appear in the course of the following description, in which reference is had to the accompanying drawings forming a part of this specification, like characters of reference designating similar parts throughout the several views, wherein:

Figure 1 is a top plan view of a hay loader constructed in accordance with the present invention. Fig. 2 is a central longitudinal section thereof. Fig. 3 is a rear elevation thereof, the rake teeth being omitted for clearness of illustration. Fig. 4 is a side elevation thereof. Fig. 5 is a transverse section on the line 5—5 of Fig. 1. Fig. 6 is a view representing in side elevation, one of the rake teeth, the other teeth being similarly constructed.

Referring specifically to the accompanying drawings, the numeral 1 designates the main shaft upon which the traction wheels 2 are fast. The supporting frame for the mechanism is constituted of angular members having longitudinal portions 3 formed at their rear ends with openings 4, surrounding the shaft 1 and having transverse portions 5, extending inwardly from said longitudinal portions and having their extreme ends bent as at 5. The ends 6 confront one another and are connected on each side of a central reach 7 which projects forwardly and beneath the wagon into which the hay is loaded. Secured to the portions 3, at the front ends thereof are vertical parallel posts 8 connected at their upper ends by a cross piece 9. The side bars of the frame are designated by the numeral 10 and at their rear ends are formed with openings 11 which surround the shaft 1. Said side bars are inclined forwardly and upwardly and are formed with a vertical line of openings 10' by means of which they have connection by a pin 12, with the adjacent posts 8. At their upper ends the bars 10 are formed with openings 13 constituting bearings for a transverse shaft 14. Between said openings mortise recesses 15 are cut into the lower edge of the bars 10 and receive the ends of transverse bars 16 forming a part of the conveyer frame, the rest of said frame being constituted of spaced parallel longitudinal bars 18 which are connected to the transverse bars 16. The conveyer is driven from the shaft 1 and comprises a plurality of parallel longitudinal endless belts which are designated by the numeral 19 and are trained over a corresponding number of pulleys 20 on the respective shafts 1 and 14. The outermost of the pulleys 20 are formed with flanges 21 for preventing displacement of the conveyer as an entirety. The belts 19 in their parallel relation conjointly support a plurality of spaced parallel transverse conveyer slats 22, each of which is provided with a plurality of projecting teeth 23.

The rake frame is constituted of vertical posts 24, formed at their lower ends with openings 25 to surround the shaft 1 and at their upper ends with openings 26, to receive the trunnions 27 of the rake bar 28. The posts 24 are held against displacement by the provision of connecting braces 29 having their front ends fixed to the posts 8 and having their rear ends formed with openings 30 to surround the trunnions 27. The bar 28 is formed in its upper surface with recesses 31 extending transversely thereof in parallel relation and designed to receive the ends of rake teeth 32. The teeth 32 are similarly constructed and comprise semi-circular working portions, the upper ends of which are extended horizontally as at 33, are then bent upwardly at a right angle as at 34, and are then bent rearwardly as at 35 in parallelism to the parts 33. It will thus be seen that the parts 33, 34 and 35, afford a clip of substantial U-shape which surrounds the front part of the bar 28, the parts 35 being received in the recesses 31. Said parts 35 are formed with flat upper faces 36. A bar 37 is imposed upon the bar 28 and bears against the flat faces 36 to prevent any rotation of the rake teeth in the seats afforded by the recesses 31. One of the trunnions 27 projects beyond its post 24 and carries a manually operated lever 38 which is fast on said trunnion, and which works about a rack sector 39, a pawl 40 being provided on the lever 38 for engagement with the teeth of the sector 39.

By movement of the lever 38 in the proper direction the rake bar 28 is given a rocking adjustment to set the teeth 32 at desired angles in accordance with the conditions of use.

From the foregoing description it will be seen that simple and efficient means are provided for accomplishing the objects of the invention, but, while the elements herein shown and described are well adapted to serve the functions set forth, it is obvious that various minor changes may be made in the proportions, shape and arrangement of the several parts without departing from the spirit and scope of the invention as defined in the appended claims.

What is claimed is:

A machine of the type set forth comprising a wheeled frame, an endless conveyer supported from said frame and movable forwardly and upwardly, means for operating said conveyer, vertical posts supported from said frame, a rake bar having trunnions journaled in said posts, means for rocking said rake bar to selected positions, said rake bar having recesses in its upper surface extending transversely thereof in parallelism, rake teeth having angular end portions disposed within said recesses, said end portions having flat upper faces and a bar imposed on said rake bar and bearing against said flat upper faces.

In testimony whereof, I affix my signature, in presence of two witnesses.

CHARLES E. CLUGSTON

Witnesses:
JOHN W. GRANNELL,
HUGO H. WENDT.